United States Patent [19]
Oh et al.

[11] Patent Number: 5,422,978
[45] Date of Patent: Jun. 6, 1995

[54] EXTENSIBLE FUZZY NEURON DEVICE

[75] Inventors: Masanari Oh; Akio Yoshitake, both of Fukuoka, Japan

[73] Assignee: Rohm Co., Ltd., Kyoto, Japan

[21] Appl. No.: 992,912

[22] Filed: Dec. 18, 1992

[30] Foreign Application Priority Data

Dec. 28, 1991 [JP] Japan .................................. 3-359886

[51] Int. Cl.$^6$ .............................................. G06G 7/00
[52] U.S. Cl. ......................................... 395/3; 395/900
[58] Field of Search .............................. 395/3, 61, 900

[56] References Cited

U.S. PATENT DOCUMENTS

| | | | |
|---|---|---|---|
| 5,131,071 | 7/1992 | Tsutsumi et al. | 395/900 |
| 5,168,549 | 12/1992 | Takogi et al. | 395/3 |
| 5,179,624 | 1/1993 | Amano et al. | 395/3 |
| 5,222,191 | 6/1993 | Enomoto | 395/3 |
| 5,292,995 | 3/1994 | Usa | 395/900 |
| 5,299,283 | 3/1994 | Hamamoto | 395/900 |

FOREIGN PATENT DOCUMENTS 2-310782 12/1990 Japan .

OTHER PUBLICATIONS

Gupta et al, "Synaptic and Somatic Learning and Adaptation in Fuzzy Neural System", 1991 IEEE Int'l Joint Conf or Neurol Networks, Nov. 18–21 1991, pp. 875–880 vol. 1.
Yamakawa, "A Fuzzy Neuron and Its Application to Hand Written Character Recognition System", 1991 Int'l Symposium on Circuits & Systems, Jun. 11–14 1991, pp. 1369–1372 vol. 3.
Shive et al, "On Designing Fuzzy Learning Neurol-Automota", IEEE Int'l Conf on Neural Networks, Jun. 21–24 1987, pp. 299–307.
"A Fuzzy Neuron Chip and Its Application to a Pattern Recognition System," IFSA'91 Brussels (1991).

*Primary Examiner*—Allen R. MacDonald
*Assistant Examiner*—Stuart B. Shapiro
*Attorney, Agent, or Firm*—Oliff & Berridge

[57] ABSTRACT

A fuzzy neuron device which applies the fuzzy theory and the neuron theory. The device comprises a plurality of synapses each having a membership function, a first minimum value computing circuit for extracting the minimum value signal in the device from the outputs of the plurality of synapses, an extension circuit which is a component of a second minimum value computing circuits, and an extension terminal for connecting a plurality of extension circuit to each other so as to produce the second computing circuit. A device assembly may be produced by connecting a plurality of the devices to each other. In the device assembly, the second computing circuit extracts the minimum value signal in the assembly from the plurality of minimum signals in the respective devices.

7 Claims, 4 Drawing Sheets

EXTENSIBLE FUZZY NEURON DEVICE

BACKGROUND OF THE INVENTION

1. Field of the Invention

The present invention relates to a fuzzy neuron device which applies the fuzzy theory and the neuron theory.

2. Description of the Related Art

A neuron computer is known as one of the computer systems. The neuron computer has a structure simulating the human brain. In the neuron computer, a neuron unit (neuron element) corresponds to a neuron of the human brain. Neuron units are combined with each other by a communication line which is called a synapsis, thereby constituting a neural network.

A plurality of weighted signals are input to each neuron unit, and when the sum of the input signals exceeds a predetermined threshold value, the neuron unit outputs a signal. In a neuron unit represented by such a mathematical model, appropriate values obtained from learning are allotted to the weighting coefficient and the threshold value, respectively.

The neuron computer is used for the purpose of pattern recognition. For example, it is used for the purpose of recognition of a hand-written letter. In this case, the actual neuron computer needs to have a neuron network composed of a plurality of layers. A multiplicity of neuron units are therefore required, so that it takes much labor and time to set the weighting coefficient and the threshold value to each neuron unit from learning.

To solve this problem, a new neuron device in which the fuzzy theory is applied to the neuron theory has been proposed (see, for example, A fuzzy Neuron Chip and Its Application to a Pattern Recognition System, IFSA '91 (1991)).

When the new fuzzy neuron device is used so as to recognize a hand-written letter, a characteristic extracting line (hereinunder referred to simply as "line") is used in order to extract the characters of the letter as the object of recognition. A plurality of synapses are connected to the line, and of the signals output from these synapses, the signal having the minimum value is output as the output signal of the fuzzy neuron unit. This output signal represents the recognized letter.

The system for incorporating the fuzzy neuron device into hardware is largely classified into two systems. One is a serial system and the other is a parallel system.

In the serial system, the signals necessary for computation are converted into digital signals, and the digital signals are processed by a digital circuit in time series.

In the parallel system, the signals necessary for computation are processed as they are in parallel.

The serial system is advantageous in that the number of lines and the number of synapses are freely extensible (can be increased) but disadvantageous in that the processing speed is slow. On the other hand, in the parallel system, although the processing speed is high because the signals are processed in parallel, the extension of the number of lines and the number of synapses is difficult, so that the number of lines and the number of synapses must be determined at the stage of designing the circuit.

FIG. 1 shows the circuit structure of a conventional fuzzy neuron device of a parallel system.

A plurality of synapses S are connected to a minimum value computing circuit 10. In each synapsis S, a membership function based on the fuzzy theory is stored, and each synapsis outputs a signal which corresponds to an input signal on the basis of the membership function. The minimum value computing circuit 10 extracts the signal taking the minimum value from among the signals output from the synapses S and outputs the extracted signal to an output terminal 12. In this device, three synapses correspond to one line. Of the three synapses, one is an excitatory synapsis, another is an inhibitory synapsis and the other is an exitatory or inhibitory synapsis.

Eight lines, for example, are input to the fuzzy neuron device (chip). That is, the fuzzy neuron device has twenty-four synapses.

In the case of using the fuzzy neuron device for the recognition of a letter, such a reading device as shown in FIG. 2 is used in order to read the pattern of the letter. In FIG. 2, a plurality of optical sensors P are arranged in a matrix. One line corresponds to a vertical or horizontal group of optical sensors P. The signal of each line is input to a predetermined number of (three) synapses shown in FIG. 1.

The parallel system shown in FIG. 1 is advantageous in that the processing speed is high, as described above. However, the number of lines and the number of synapses must be determined at the stage of designing the circuit, and it is very difficult to increase or reduce the number thereafter.

In a conventional fuzzy neuron device, it is therefore not easy to increase the number of synapses or the like by connecting a plurality of fuzzy neuron devices to each other. Although the extension is not impossible if another device (circuit) is inserted between the fuzzy neuron devices, it leads to complication of the system and a rise in cost.

SUMMARY OF THE INVENTION

Accordingly, it is an object of the present invention to solve the above-described problems in the related art and to provide a fuzzy neuron device of a parallel system which is easy to connect with another fuzzy neuron device and which facilitates the extension of the number of synapses or the like.

To achieve this aim, a fuzzy neuron device according to the present invention comprises: a plurality of synapses each having a membership function; a first minimum value computing circuit for extracting the signal taking the minimum value from the output signals of the plurality of synapses and outputting the extracted signal as the minimum value signal in the device; an extension circuit for receiving the minimum value signal in the device; and an extension terminal.

By connecting the extension terminals of a plurality of fuzzy neuron devices in parallel, a fuzzy neuron device assembly is produced. In this case, the extension circuits are connected to each other in parallel, thereby constituting a second minimum value computing circuit.

The second minimum value computing circuit extracts the signal having the minimum value from a plurality of minimum value signals in the respective devices and outputs the extracted signal as the minimum value signal in the assembly.

Not only is the fuzzy neuron device used as a single body, but also the extension devices of a plurality of fuzzy neuron devices may be connected to each other so as to increase the number of synapses and/or lines when the number of synapses or the like is insufficient.

Thus, the present invention provides a fuzzy neuron device of a parallel system having high flexibility.

The above and other objects, features and advantages of the present invention will become clear from the following description of the preferred embodiments thereof, taken in conjunction with the accompanying drawings.

DESCRIPTION OF THE PREFERRED EMBODIMENTS

Figure 3:
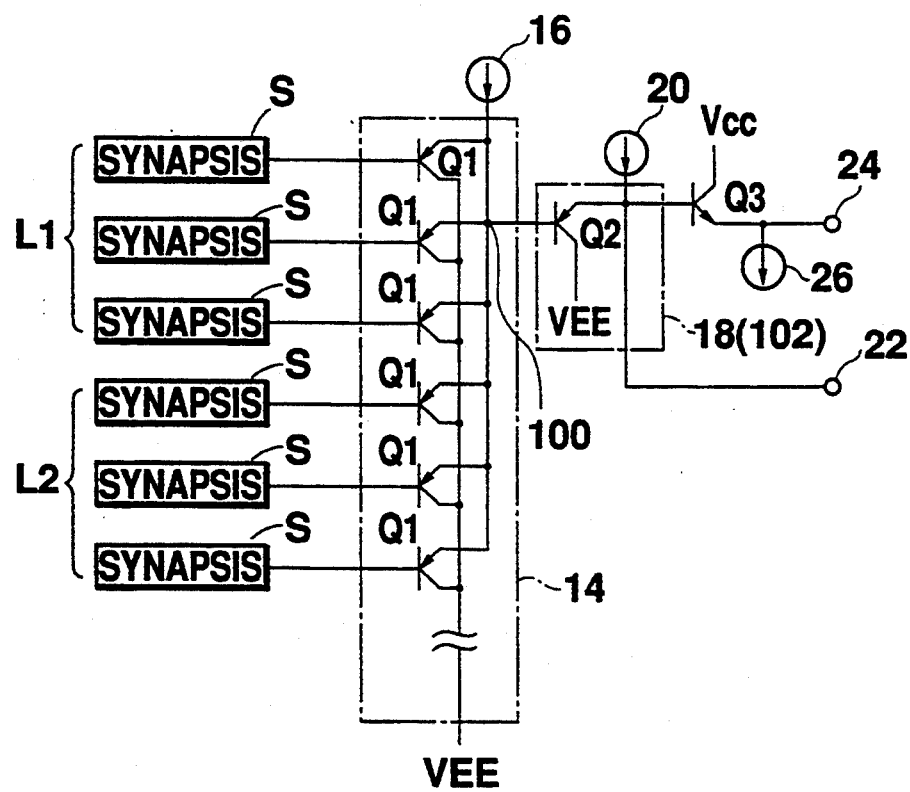
FIG. 3 shows the structure of a fuzzy neuron circuit according to the present invention.
Figure 4:
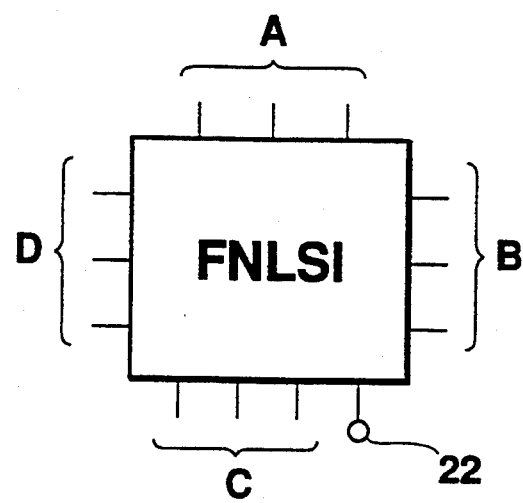
FIG. 4 is an external view of a fuzzy neuron device according to the present invention.

FIG. 3 shows the structure of a fuzzy neuron circuit according to the present invention. A fuzzy neuron device according to the present invention is composed of the fuzzy neuron circuit shown in FIG. 3 formed on a semiconductor chip, and a package accommodating the chip. FIG. 4 is an external view of the fuzzy neuron device.

In FIG. 3, a plurality of synapses S are connected to a minimum value computing circuit 14. Each synapse S has a membership function based on the fuzzy theory, and when a signal is input from the line, each synapse S outputs a signal having the level corresponding to the membership function.

In the circuit shown in FIG. 3, three synapses correspond to one line. Of the three synapses, one is an excitatory synapse, another is an inhibitory synapse and the other is an exitatory or inhibitory synapse.

Eight lines, for example, are input to the actual fuzzy neuron device. That is, the fuzzy neuron device may have twenty-four synapses.

A signal is input from each synapse to the minimum computing circuit 14 (first minimum value computing circuit). The minimum value computing circuit 14 extracts the signal of the minimum level from among the signals output from the plurality of synapses, and outputs the extracted signal as the minimum value signal in the device.

The minimum value computing circuit 14 includes the same number of PNP transistors Q1 as the number of synapses. The transistors Q1 are connected to each other by a wire or the like.

A signal of each synapse is input to the base of the corresponding transistor Q1, and a reference voltage VEE is applied to the collector of each transistor Q1. The emitters of the transistors Q1s are connected to a constant current source 16 in common. The minimum value signal in the device is therefore taken out of a common connection 100. In other words, the minimum level of the output levels of the plurality of synapses Ss determines the potential of the common emitter connection 100.

An extension circuit 18 includes a PNP transistor Q2. The base of the transistor Q2 is connected to the connection 100, so that the minimum value signal in the device is supplied to the base of the transistor Q2. The reference voltage VEE is applied to the collector of the transistor Q2, and the emitter thereof is connected to a constant current source 20. The emitter of the transistor Q2 is further connected to an extension terminal 22 and the base of an NPN transistor Q3, which constitutes an output circuit. As shown in FIG. 4, the extension terminal 22 is led externally from the device package.

Referring again to FIG. 3, when a plurality of extension circuits 18 are connected to each other in parallel (see FIG. 5), a second minimum value computing circuit 102 is produced. In this case, a plurality of transistors Q2 are connected to each other by a wire or the like. As a result, the second minimum value computing circuit 102 has the same structure as the first minimum value computing circuit 14. Any number of extension circuits 18 may be connected to each other. In other words, the scale of the circuit of the second minimum value computing circuit 102 is determined by the number of extension circuits 18 connected.

Figures 1, 2:
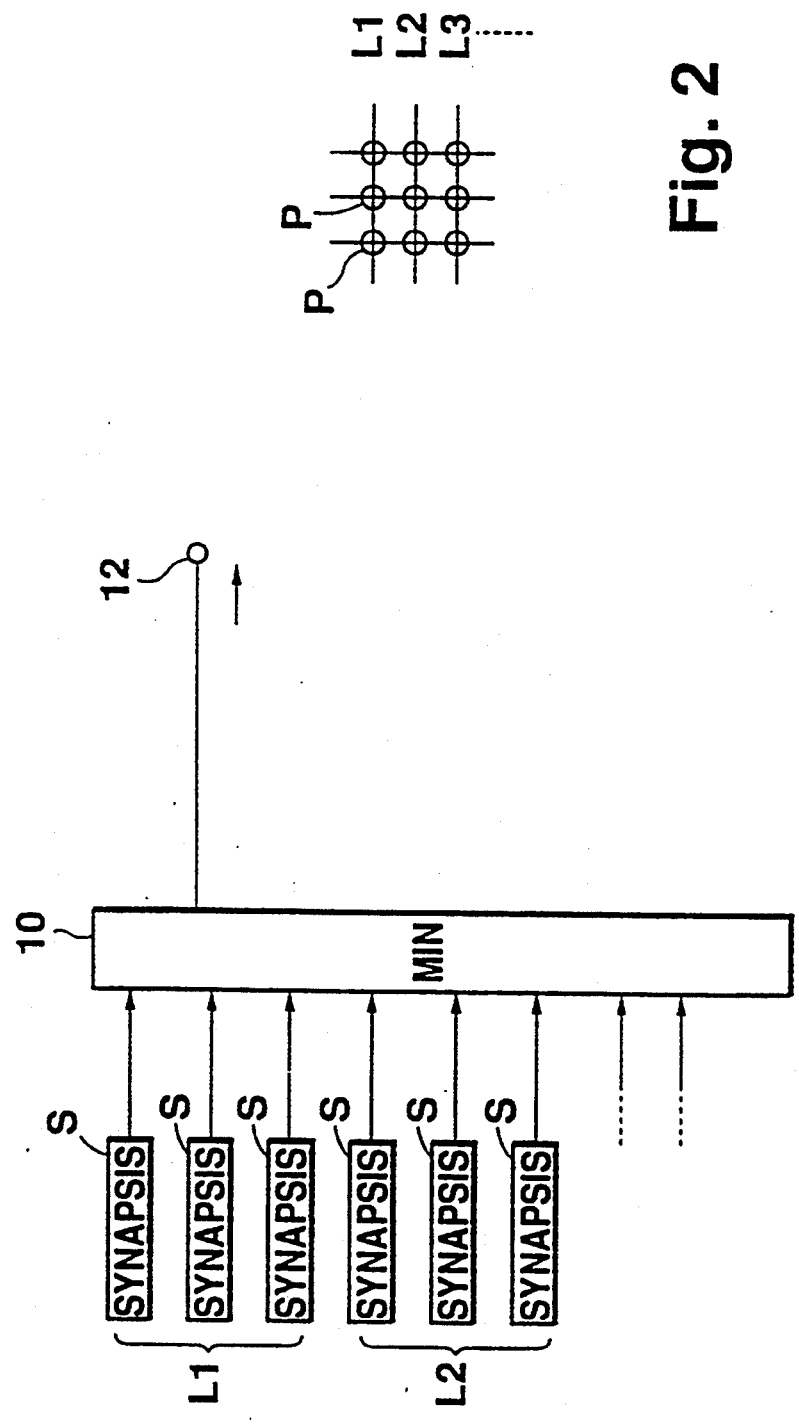
FIG. 1 shows the structure of a conventional fuzzy neuron circuit of a parallel system.
FIG. 2 shows the relationship between optical sensors and lines arranged for the purpose of recognition of a letter.

In the case of producing a device assembly by connecting a plurality of devices (see FIG. 5), the minimum value signal in the assembly, which is the output of the second minimum value computing circuit 102 can be taken out of the output terminal 24 of each device (see FIG. 1). That is, since the same signal is output to any of the output terminals 24 in the assembly, the output signal may be taken out of any of the output terminals 24.

In this way, by providing an extension circuit 18 which constitutes a component of the second minimum value computing circuit 102 in the fuzzy neuron device, free extension of the number of synapses or the like is enabled.

Single use of the device is naturally possible. In the case of connecting no other extension terminal to the extension terminal 22, the minimum signal supplied to the common connection 100 is supplied directly and singly to the output transistor Q3.

A constant voltage VCC is supplied to the collector of the transistor Q3, which constitutes the output circuit, and the emitter of the transistor Q3 is connected to a constant current source 26.

In FIG. 4, the package of the fuzzy neuron device (FNLSI) is provided with the above-described extension terminal 22 and an output terminal 24 (not shown) as well as a plurality of input terminals.

In the device shown in FIG. 4, the plurality of input terminals are classified into four groups A, B, C and D. Each group corresponds to one line. One line corresponds to three synapses. The number of lines and the number of synapses which are input to one device are not restricted to those shown in FIG. 4, and they can be freely set.

Figure 5:
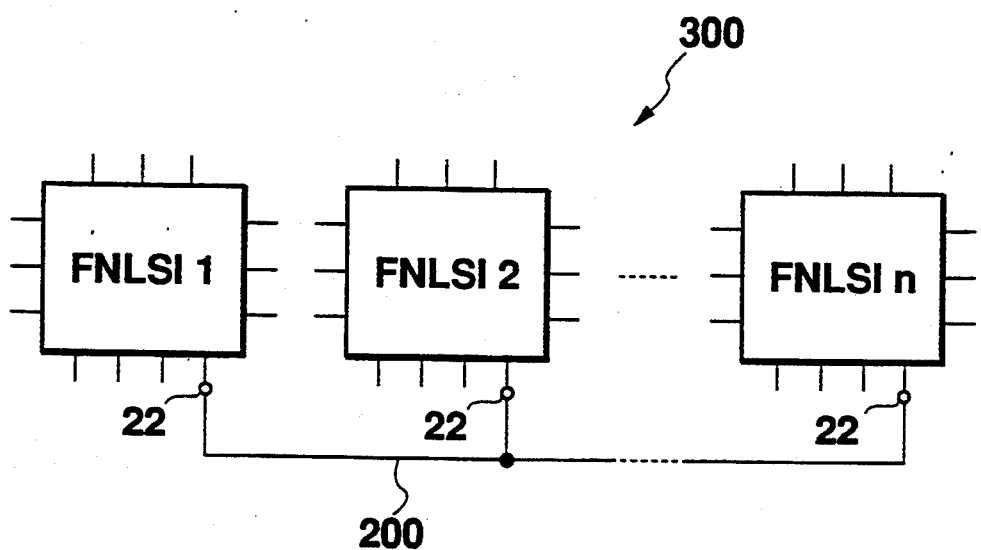
FIG. 5 shows the structure of a device assembly produced by extending the fuzzy neuron device according to the present invention.

FIG. 5 shows a device assembly 300 produced by connecting a plurality of devices FNLSIs to each other through the extension terminals 22. By connecting the extension terminals 22 in parallel by a signal line 200, it is easy to extend the number of synapses or the like.

A method of extending the number of synapses or the like will now be explained with reference to FIGS. 6 to 8.

Figure 6:
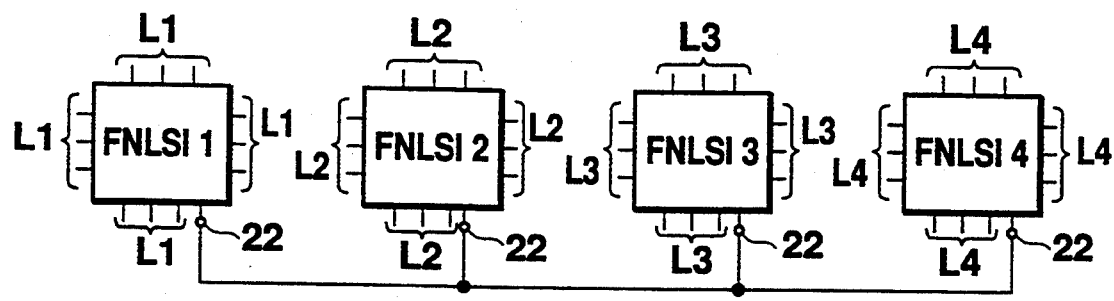
FIG. 6 shows the extension of the number of lines.

FIG. 6 shows the structure for extending the number of synapses. In this example, the number of synapses per line is twelve. That is, the number of synapses is increased by four times compared with the case of using only one device having four lines and twelve synapses.

Figure 7:
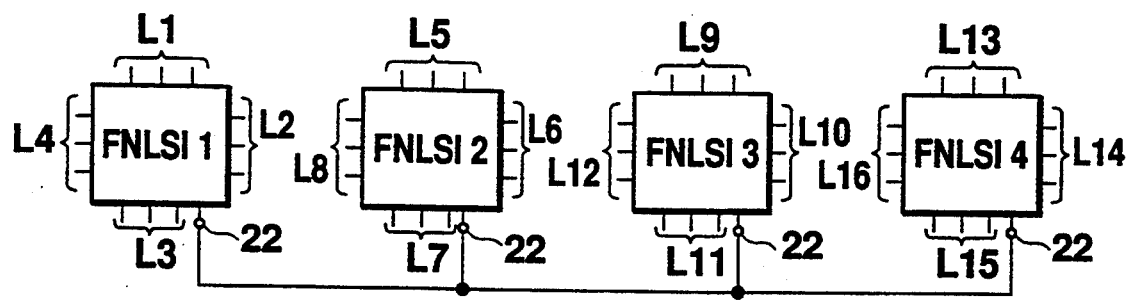
FIG. 7 shows the extension of the number of synapses.

FIG. 7 shows the structure for extending the number of lines. In this example, the number of lines is increased by four times compared with the case of using only one device having four lines and twelve synapses.

Figure 8:
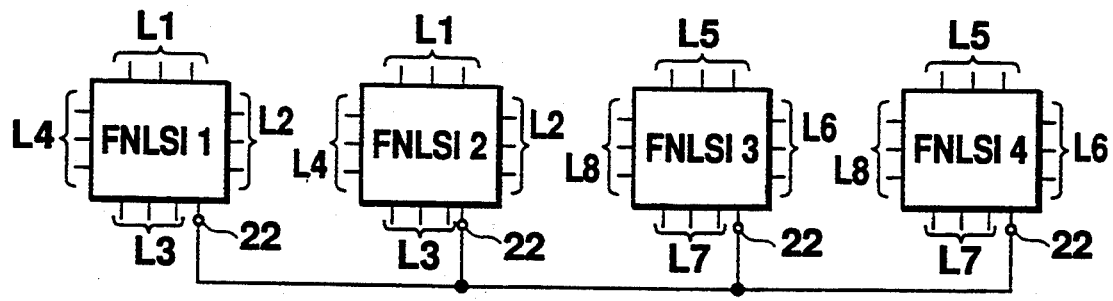
FIG. 8 shows the extension of the number of synapses and the number of lines.

FIG. 8 shows the structure for extending both the number of synapses and the number of lines. In this example, the number of synapses and the number of lines are doubled compared with the case of using only one device having four lines and twelve synapses.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A fuzzy neuron device assembly comprising:
a plurality of fuzzy neuron devices each of said plurality of fuzzy neuron devices including:
(a) a plurality of synapses, each of which defines a membership function, receives an input signal, and outputs an output signal specified by application of said input signal to said membership function,
(b) a first minimum value computing circuit extracting a first minimum value signal from among output signals output from said plurality of synapses,
(c) an extension circuit receiving said first minimum value signal, and
(d) an extension terminal connecting said extension circuit to the extension circuit of other ones of said plurality of fuzzy neuron devices; and
a second minimum value computing circuit comprising a plurality of said extension circuits connected to each other through said extension terminal of each of said plurality of fuzzy neuron devices, the second minimum value computing circuit extracting a second minimum value signal in said fuzzy neuron device assembly from said first minimum value signals of each of said plurality of fuzzy neuron devices wherein each of said extension circuits computes the second minimum value signal from among said first minimum value signals, said extension circuit includes a transistor having a base, a collector and an emitter, said first minimum value signal is supplied to the base of said transistor, a constant voltage source is connected to the collector of said transistor, and the emitter of said transistor is connected to said extension terminal, a constant current source and an output circuit, the output circuit receiving and outputting the second minimum value signal.

2. A fuzzy neuron device assembly comprising:
a plurality of fuzzy neuron devices, each of said plurality of fuzzy neuron devices including:
(a) a plurality of synapses, each of which defines a membership function, receives an input signal, and outputs an output signal specified by application of said input signal to said membership function,
(b) a first minimum value computing circuit extracting a first minimum value signal from among output signals output from said plurality of synapses,
(c) an extension circuit receiving said first minimum value signal, and
(d) an extension terminal connecting said extension circuit to the extension circuit of other ones of said plurality of fuzzy neuron devices; and
a second minimum value computing circuit comprising a plurality of said extension circuits connected to each other through said extension terminal of each of said plurality of fuzzy neuron devices, the second minimum value computing circuit extracting a second minimum value signal in said fuzzy neuron device assembly from said first minimum value signals of each of said plurality of fuzzy neuron devices, wherein each of said extension circuits computes the second minimum value signal from among said first minimum value signals, said first minimum value computing circuit includes a plurality of transistors, each of said plurality of transistors having a base, a collector and an emitter, a number of said plurality of transistors is equal to the number of said plurality of synapses, each of said plurality of synapses supplying a signal to the base of a corresponding one of said plurality of transistors, the collector of each of said plurality of transistors is connected to a constant voltage source, the emitter of each of said plurality of transistors is commonly connected to emitters of other ones of said transistors and to a constant current source, and said first minimum value signal is generated at a common connection of said commonly connected emitters of said plurality of transistors.

3. A fuzzy neuron device comprising:
a semiconductor chip having an electronic circuit, the semiconductor chip being housed in a package, said electronic circuit including:
(a) a plurality of synapses each of which defines a membership function, receives an input signal, and outputs a signal specified by application of said input signal to said membership function;
(b) a minimum value computing circuit extracting first minimum value signal from among each signal output from said plurality of synapses;
(c) an extension terminal located in the package for connection to circuitry located outside the package; and
(d) extension circuit means for comparing and outputting the smaller of a signal received from the circuitry located outside the package through said extension terminal and said first minimum value signal, wherein said extension circuit includes a transistor having a base, a collector and an emitter, said first minimum value signal is supplied to the base of said transistor, a constant voltage source is connected to the collector of said transistor, and the emitter of said transistor is connected to said extension terminal, a constant current source and an output circuit, the output circuit having an output terminal separate from the extension terminal.

4. A fuzzy neuron device comprising:
a semiconductor chip having an electronic circuit, the semiconductor chip being housed in a package, said electronic circuit including:
(a) a plurality of synapses each of which defines a membership function, receives an input signal, and outputs a signal specified by application of said input signal to said membership function;
(b) a minimum value computing circuit extracting first minimum value signal from among each signal output from said plurality of synapses;

(c) an extension terminal located in the package for connection to circuitry located outside the package; and (d) extension circuit means for comparing and outputting the smaller of a signal received from the circuitry located outside the package through said extension terminal and said first minimum value signal, wherein said minimum value computing circuit includes a plurality of transistors, each of the plurality of transistors having a base, a collector and an emitter, a number of the plurality of transistors is equal to a number of said plurality of synapses, each of said plurality of synapses supplying a signal to the base of a corresponding one of said plurality of transistors, the collector of each of said plurality of transistors is connected to a constant voltage source, the emitter of each of said plurality of transistors is commonly connected to emitters of other ones of said plurality of transistors and to a constant current source, and said first minimum value signal is generated at a common connection of said commonly connected emitters of each of said plurality of transistors.

5. A fuzzy neuron device assembly comprising:

a plurality of fuzzy neuron devices, each of said plurality of fuzzy neuron devices being formed on a semiconductor chip having an electronic circuit, each semiconductor chip being housed in a package and each electronic circuit including:

(a) a plurality of synapses, each of which defines a membership function, receives an input signal, and outputs an output signal specified by application of said input signal to said membership function, (b) a first minimum value computing circuit extracting a first minimum value signal from among output signals output from said plurality of synapses, (c) an extension circuit receiving said first minimum value signal, and (d) an extension terminal located in each package connecting said extension circuit to the extension circuit of other ones of said plurality of fuzzy neuron devices; and a second minimum value computing circuit comprising a plurality of said extension circuits connected to each other through said extension terminal of each of said plurality of fuzzy neuron devices, the second minimum value computing circuit extracting a second minimum value signal in said fuzzy neuron device assembly from said first minimum value signals of each of said plurality of fuzzy neuron devices wherein each of said extension circuits computes the second minimum value signal from among said first minimum value signals.

6. A fuzzy neuron device assembly according to claim 5, wherein:

each extension circuit includes a transistor having a base, a collector and an emitter;

said first minimum value signal is supplied to the base of said transistor;

a constant voltage source is connected to the collector of said transistor; and the emitter of said transistor is connected to said extension terminal, a constant current source and an output circuit, the output circuit receiving and outputting the second minimum value signal at an output terminal, the output terminal being separate from the extension terminal.

7. A fuzzy neuron device assembly according to claim 5, wherein:

each first minimum value computing circuit includes a plurality of transistors, each of said plurality of transistors having a base, a collector and an emitter, a number of said plurality of transistors equal to the number of said plurality of synapses, each of said plurality of synapses supplying a signal to the base of a corresponding one of said plurality of transistors;

the collector of each of said plurality of transistors is connected to a constant voltage source;

the emitter of each of said plurality of transistors is commonly connected to emitters of other ones of said transistors and to a constant current source; and said first minimum value signal is generated at a common connection of said commonly connected emitters of said plurality of transistors.

* * * * *